United States Patent Office 3,630,998
Patented Dec. 28, 1971

---

3,630,998
PROCESS FOR THE MANUFACTURE OF WATER-SOLUBLE, CURABLE CONDENSATES CONTAINING CARBOXYL GROUPS
Luzius Schibler, Riehen, Switzerland, assignor to Ciba Limited, Basel, Switzerland
No Drawing. Filed Sept. 30, 1968, Ser. No. 763,912
Claims priority, application Switzerland, Oct. 13, 1967, 14,309/67
Int. Cl. C08g 9/30, 9/34, 9/10
U.S. Cl. 260—67.6 R                             10 Claims

---

ABSTRACT OF THE DISCLOSURE

The present invention provides a process for the manufacture of water-soluble, curable condensates containing carboxyl groups, wherein the methylol groups of aminoplast precondensates are etherified with monohydroxy compounds and aliphatic hydroxycarboxylic acid esters and then the carboxylic acid ester groups are hydrolyzed in an alkaline medium. The condensates are useful reactive tensides.

---

The present invention provides a process for the manufacture of water-soluble, curable condensates containing carboxyl groups, wherein the methylol groups of aminoplast precondensates are etherified with monohydroxy compounds and aliphatic hydroxycarboxylic acid esters and then the carboxylic acid ester groups are hydrolyzed in an alkaline medium.

Suitable monohydroxy compounds are low-molecular compounds containing 1 to 5 carbon atoms as well as high-molecular compounds with 6 to 22 carbon atoms. However, while the low members of the series may be used exclusively, the suitability of compounds containing a higher number of carbon atoms is restricted in that they cannot be used by themselves but only as an additional constituent of the etherification products. Their incorporation into the condensates is advantageously performed simultaneously with a lower alcohol or by transetherification, the ether formed with a lower alcohol being reacted at an elevated temperature and in an acid ambience with the monohydroxy compound having a higher molecular weight. In this reaction the less volatile compound takes the place of the more volatile alcohol which is then distilled off, if necessary under vacuum.

According to a preferred process (a) an ether of an aminoplast precondensate containing methylol groups with a monohydric alcohol containing 1 to 5 carbon atoms, is reacted
(b) if desired with a monohydroxy compound containing at least one carbon atom more than the alcohol of the component (a), then transetherified with
(c) an aliphatic hydrocarboxylic acid ester and
(d) possibly with an amine containing hydroxyl groups and
(e) the carboxylic acid ester groups are then hydrolyzed in an alkaline medium.

The term aminoplast precondensates describes adducts of formaldehyde with methylolable nitrogen compounds, from among which there may be mentioned 1,3,5-aminotriazines such as N-substituted melamines, for example N-butylmelamine, N-trihalogenomethylmelamines, as well as ammeline, guanamines, for example benzoguanamine, acetoguanamine or diguanamines. Further suitable are symmetric alkyltriazones, thiourea, biuret, alkylcarbamates, guanidine, alkyl- and aryl-ureas and -thioureas, alkylene ureas and diureas, for example ethylene urea, propylene urea or acetylene diurea; 4,5-dihydroxy-imidazolidone-2 and its derivatives, for example the 4,5-dihydroxyimidazolidone-2 substituted in 4-position on the hydroxyl group by the residue

—CH₂CH₂CO—NH—CH₂—OH

The methylol compounds of urea and of melamine are preferred. In general, specially valuable products are obtained with products of as high a degree of methylolation as possible. Suitable starting products are both the predominantly mono-molecular and the more highly condensed compounds.

The ethers of these aminoplast precondensates, which are used as component (a) in the preferred variant of the process of this invention, are ethers of alkanols, for example methanol, ethanol, propanol, isopropanol, butanols or pentanols. Particularly suitable are the n-butyl ethers of the aminoplast precondensates as component (a).

By reaction with the component (b) hydrophobic residues can be introduced into component (a), or the existing hydrophobic character due to the alkyl residues present may be enhanced. Accordingly, preferred alkyl ethers with 1 to 5 carbon atoms of the aminoplast precondensates [=component(a)] are reacted with monohydroxy compounds that contain 6 to 22 carbon atoms. Thus, for example, butanol residues already present in the molecule may be partially replaced by way of transetherification by higher residues, for example those of n-octanol, lauryl, stearyl or behenyl alcohol or mixtures of such alcohols, so that the product preferably contains as residues of monohydroxy compounds with at least 6 carbon atoms the residues of alkanols with 6 to 22 carbon atoms. Further suitable monohydroxy compounds, that is to say component (b), are aromatic alcohols such as benzyl alcohol, hydroxybenzenes, hydroxynaphthalenes and more especially the known hydroxyalkylbenzenes such as 1-hydroxy-, 4-nonyl- or -tertiary butylbenzene, furthermore alicyclic monohydroxy compounds such as hydroabietyl alcohol. The molecule chain of the hydroxy compound may be interrupted by nitrogen atoms as is the case with carboxylic acid methylolamides, for example with stearic acid methylolamide. Instead of the alcohols there may be used as monohydroxy compounds the corresponding monocarboxylic acids which may be reacted with the etherified methylol compounds whereby products containing carboxylic acid ester groups are obtained. As relevant examples there may be mentioned oleic acid, coconut fatty acid and stearic acid.

However, the reaction with the component (b) can be dispensed with when the component (a) as such contains suitable hydrophobic residues or when no enhancement of the hydrophobic properties is aimed at.

It is advantageous to perform the reaction of component (a) with component (b) and the transetherification with component (c) at the same time.

Preferred aliphatic hydroxycarboxylic acid esters are the esters of glycollic acid. Other suitable hydroxycarboxylic acid esters are, for example, esters of 3-hydroxypropionic acid, 4-hydroxybutyric acid, tartaric, malic or lactic acid, or acetoacetic ester present in the enol form. Preferred use is made of the alkyl esters of these acids whose alkyl radical contains 1 to 6 carbon atoms. Particularly good results have been obtained with glycollic acid n-butyl ester.

According to this invention the condensates are generally manufactured by first preparing the methylol compounds, for example of urea or of melamine, which are then etherified in known manner with monohydric alcohols containing 1 to 5 carbon atoms. The ethers [=component (a)] are freed from water by azeotropic distillation and, for transetherification, they are mixed with an aliphatic hydroxycarboxylic acid ester and, if required, also with a monohydroxy compound [=component (b)] which is capable of taking the place of the initially used alcohol by virtue of its higher boiling point. The batch is then heated at a slightly acidic pH value for some time at 80 to 120° C., preferably at 90 to 100° C., and the alcohol released by the transetherification, for example n-butanol, is distilled off under vacuum.

The transetherification product, which now contains carboxylic acid ester groups, is then hydrolyzed in an alkaline medium. The alkaline medium is advantageously prepared from alkali metal hydroxide, and particularly good results have been obtained with alcoholic solutions of alkali metal hydroxides. The alkali metal hydroxide may be replaced by an organic base, but at most only partially. In a preferred variant hydrolysis is achieved by heating with an alcoholic solution of sodium or potassium hydroxide to form the corresponding alkali metal salt which is freed from water and alcohol by evaporation and can be obtained as a solid, dry product. For hydrolyzing a pH value of at least 8.5, preferably of 10, is needed.

If desired, the unhydrolyzed transetherification product modified with hydroxycarboxylic acid ester groups may be further transetherified with an amine containing hydroxyl groups. This additional transetherification is as a rule performed by heating the reaction mixture together with the amine further, preferably at 100 to 120° C., during which part of the residual initial alcohol residues is replaced by the residue of the hydroxylated amine. These amines of component (d) may be primary, secondary or tertiary aliphatic, aromatic or cyclic amines containing hydroxyl groups. Specifically there may be mentioned, for example ethanolamine, diethanolamine and especially triethanolamine.

As mentioned before, the condensate, which now also contains basic groups, is then hydrolyzed in a basic medium. The resulting products have an amphoteric character.

The condensates obtained by the present process form in water clear to slightly turbid colloidal solutions, depending on how many carboxyl and possibly amino groups there are present in it. The condensates with ether groups containing more than 3 carbon atoms display a pronounced surface activity and a lathering, detergent, emulsifying and dispersing effect, depending on the kind and amount of the components used. On addition of an acid the condensates obtained according to this invention are also crosslinked or cured, whereby their surface activity can be completely annulled. They are therefore used as so-called reactive tensides, especially as curable emulsifiers, wetting agents, dispersants or detergents.

The term "tensides" (Tenside 2 1964) describes quite generally those compounds which on being dissolved in a solvent lower its surface tension; preferred solvents are water-soluble substances and water. Tenside molecules are characterized in that they contain both hydrophilic and hydrophobic groups and in multiphase systems accumulate in the phase borderfaces. The resulting reduction in borderface tension between the two liquids, or between a liquid and a solid finely dispersed therein, characterize the tensides as emulsifiers, wetting agents, detergents and dispersants.

The compounds, quite generally referred to by the term "tensides," thus, for example soaps, fatty alcohol sulphonates, alkylphenolpolyglycol ethers or cationic products, such as the so-called "invert soaps" are both "active" insofar as their reducing effect on the surface tension is concerned, and chemically in general perfectly stable; more especially, they are neither polymerizable nor autocrosslinkable. They differ from the so-called "reactive" tensides in that the hydrophobic portion of the molecule of the latter consists of an aminoplast residue which is crosslinked or cured in an acid medium and/or at an elevated temperature. It has been observed that in this crosslinking process the tenside molecules lose their solubility and therewith their tenside activity, of which many technical uses can be made. In many cases it is desirable to annul the wetting, dispersing or emulsifying effect after a preparation has been used, a problem that can be resolved in almost ideal manner with such reactive tensides.

The new condensates may also be used quite generally as finishes in textile improving operations. Since they are reactive or curable, they can be converted in an acid solution or on heating of the dry substance in the presence of acids, into crosslinked, infusible resins that do not dissolve even in alkalies and thus furnish finishes that are resistant to washing.

Another object of the present invention are the new water-soluble, curable, carboxylated condensates of aminoplast precondensates containing residues of monohydroxy compounds, residues of aliphatic carboxylates and, if desired, also residues of hydroxylated amines.

Parts in the following manufacturing instructions and examples are by weight.

Manufacturing instructions for starting materials (A) A mixture of 206 parts of 36.5% aqueous formaldehyde, 170 parts of n-butanol and 60 parts of urea is mixed with 8 parts of 25% ammonia and heated in a stirring flask equipped with descending condenser for 2 hours at 96° C., during which a total of 32 parts of an n-butanol+water mixture passes over. The batch is then cooled cooled to about 50° C. and 1 part of 85% phosphoric acid, dissolved in 20 parts of n-butanol, is added. The whole is heated to 80° C. under vacuum, during which water and n-butanol pass over. The water is separated from the distillate, and the n-butanol is returned to the reaction vessel. After 4 hours the product is substantially anhydrous and can be mixed with benzene in any desired proportion; it is neutralized with 5 parts of triethanolamine and concentrated under vacuum to 212 parts, whereby a product is obtained which is hereinafter referred to as lacquer resin A.

(B) 126 parts of melamine are mixed with 18 parts of 25% ammonia and dissolved at 60° C. in 590 parts of 36.5% aqueous formaldehyde containing methanol. The batch is heated to 80° C. and within about 20 minutes 132 parts of a mixture of methanol and water are distilled off under vacuum. Then 490 parts of n-butanol are added and the vacuum distillation is continued, while separating the mixture of water and n-butanol which passes over. The n-butanol bows back into the reaction vessel, while 118 parts of an aqueous layer separate out. A solution of 3 parts of 85% formic acid in 5 parts of n-butanol is added and a total of 452 parts of n-butanol is distilled off, which entrains the last remnants of water, to leave 532 parts of a viscous, colourless resin which is miscible with benzene in any proportion and is referred to below as melamine-n-butanol lacquer resin B.

EXAMPLE 1

In a stirring flask 150 parts of lacquer resin A are mixed with 100 parts of glycollic acid butyl ester and 3 parts of glacial acetic acid and the whole is heated under vacuum to 80–90° C., during which 63 parts of n-butanol pass over within 1½ hours. Then 40 parts of solid potassium hydroxide dissolved in 200 parts of ethanol are added and the whole is heated at the boil for 30 minutes, during which the initially clear mixture turns turbid; it is evaporated to dryness under vacuum, to yield about 185 parts of a colourless, solid substance which gives a clear, strongly lathering solution in water. The aqueous solution has a pH value of 8.0 and is a powerful emulsifier. When it is acidified with acetic acid, a white resinous residue separates out immediately which is no longer soluble in excess alkali metal hydroxide solution. A similar product is obtained when glycollic acid butyl ester is replaced by an equivalent quantity of lactic acid ethyl ester.

EXAMPLE 2

150 parts of lacquer resin A are mixed with 22 parts of lauryl alcohol; 100 parts of glycollic acid butyl ester and 3 parts of 100% acetic acid. At 80–90° C. 68 parts of n-butanol are distilled off, the residue is stirred for 30 minutes at 90° C. and 200 parts of ethanol and 25 parts of sodium hydroxide are then added. The batch is hydrolyzed for 30 minutes at the boiling temperature of the alcohol and the solvents are then evaporated under vacuum, to yield 166 parts of a solid, colourless readily water-soluble substance. Its aqueous solution displays a slightly alkaline reaction and is an efficient wetting agent.

EXAMPLE 3

A mixture of 150 parts of lacquer resin A, 25 parts of stearic acid, 100 parts of glycollic acid butyl ester and 3 parts of glacial acetic acid is distilled for 1¼ hours under vacuum at 80–90° C., during which 67 parts of n-butanol pass over. The batch is then heated for another 15 minutes at 90° C., diluted with 200 parts of ethanol, and then 80 parts of 30% aqueous sodium hydroxide solution are dropped in, then refluxed for 30 minutes, and evaporated to dryness under vacuum, to yield a colourless, solid, friable substance which gives a clear solution in hot water. Its aqueous solution has a considerable lathering and detergent activity. When the hot washing liquor is acidified with a small quantity of sulphuric acid, an irreversible precipitate appears spontaneously and the lathering power disappears completely.

EXAMPLE 4

A mixture of 150 parts of lacquer resin A, 80 parts of glycollic acid butyl ester and 3 parts of 100% acetic acid is heated under vacuum, whereupon 60 parts of n-butanol distill over. The residue is mixed with 25 parts of triethanolamine and further condensed for 1 hour at 105 to 110° C., then diluted with 200 parts of ethanol, 20 parts of sodium hydroxide are added and the whole is hydrolyzed for 30 minutes under reflux. The alcohol is distilled off, to leave a colourless, viscid substance which readily gives a clear solution in water. The aqueous solution is of weakly alkaline reaction. When a small quantity of acid is aded to it, an insoluble, crosslinked resin settles out, whereas with an excess of acid a temporarily colloidal solution is obtained.

EXAMPLE 5

A mixture of 100 parts of lacquer resin B, 150 parts of glycollic acid butyl ester and 2 parts of glacial acetic acid is heated under vacuum to 80–90° C., during which 39 parts of n-butanol pass over within 25 minutes. The batch is further refluxed for 4 hours, then 80 parts of ethanol and 135 parts of 30% sodium hydroxide solution are added and the whole is hydrolyzed for 30 minutes at 80° C. The solvents are evaporated and the residue dried under vacuum to yield 167 parts of a colourless pulverulent substance which is readily soluble in water. When the lathering solution is mixed with 25% monobasic ammonium phosphate solution a resin settles out which is insoluble in alkali metal hydroxide solutions and can be further cured at a high temperature.

EXAMPLE 6

A mxiture of 390 parts of hexamethylolmelamine hexamethyl ether, 74 parts of lauryl alcohol and 354 parts of lactic acid ethyl ester is mixed with 5 parts of 85% phosphoric acid and heated under a weak vacuum at 80–90° C., during which within 30 minutes 80 parts of methanol pass over. The batch is stirred on for 1½ hours at 90–100° C. and then mixed with a mixture of 400 parts of 30% sodium hydroxide solution and 320 parts of ethanol; the whole is hydrolyzed for 30 minutes at 80° C. and then evaporated to dryness, to furnish 740 parts of a solid, colourless product which is readily soluble in water. When its strongly lathering solution is mixed with a small amount of acid, a white precipitate settles out which, after having been heated, is insoluble even in a strong alkali metal hydroxide solution.

EXAMPLE 7

The fact that the wetting power can be completely annulled is demonstrated by the following experiment:
Solution I:
  10 g. of the preparation of Example 2 and 0.5 g. of ammonium nitrate are dissolved in 1 litre of water.
For comparison
Solution II:
  5 g. of sodium diisobutyl-naphthalenesulphonate and 0.5 g. of ammonium nitrate in 1 litre of water is used.

Unbleached cotton calico fabrics are impregnated with these two solutions, then dried and hardened for 5 minutes at 150° C. Fabric cuttings of equal size are sprinkled with water in identical manner and the amount of water absorbed in percent is measured. From the mean values of 4 independent experiments the following results are recorded:

| Unbleached fabric: | Water absorption in percent |
|---|---|
| Untreated | 9.2 |
| Impregnated with solution I and dried | 137.0 |
| Impregnated with solution I, dried and hardened | 10.1 |
| Impregnated with solution II and dried | 138.0 |
| Impregnated with solution II, dried and hardened | 132.0 |

These results show that the wetting power of the reactive tenside is substantially annulled by the hardening, whereas the conventional wetting agent retains its effectiveness.

EXAMPLE 8

266 parts of lacquer resin B (corresponding to 0.5 mol of melamine) are mixed with 182 parts of 90% glycollic acid n-butyl ester, 67 parts of stearyl alcohol and 3 parts of glacial acetic acid, and 113 parts of n-butanol are distilled off the mixture under a weak vacuum. The residue is stirred and refluxed for 3 hours at 95–100° C. The modified resin is then diluted with 200 parts of ethanol, cooled and while stirring well at a temperature below 30° C. 165 parts of 30% sodium hydroxide solution are gradually run in, to furnish 761 parts of a thin paste containing about 45% of dry substance. 100 parts of this paste dissolved readily on being heated in 900 parts of water to form a lathering, colloidal solution which has a pH value of 10.0. 5 parts of ammonium nitrate are added to the solution and a cotton popelin fabric is impregnated with it. After drying and hardening at 150° C. the resulting fabric displays a distinct hydrophobizing effect which is fast to washing and dry cleaning.

EXAMPLE 9

266 parts of lacquer resin B are modified with 168 parts of glycollic acid n-butyl ester and 90 parts of behenyl alcohol as described in Example 8, and the ester groups are then hydrolyzed in an alcoholic solution with 30% sodium hydroxide solution. The resulting pasty product forms a colourless powder after drying. In a solution containing 2.5 parts of solid or 5 parts of pasty product as well as 0.25 part of ammonium nitrate per litre spun rayon mouslin is impregnated, then dried and hardened at 150° C. A slightly hydrophobizing soft-handle finish is obtained which is fast to washing and dry cleaning.

EXAMPLE 10

400 parts of a 80% solution of tetramethylol acetylene diurea tetramethyl ether in methanol [prepared from 142 parts of acetylene diurea by addition of formaldehyde and etherification with methanol (see Houben-Weyl, volume XIV/2, Makromolekulare Stoffe, Part 2, page 353)] together with 272 parts of n-octadecanol, 412 parts of tartaric acid diethyl ester and 6 parts of glacial acetic acid are heated under a weak vacuum for 1¾ hours at 95–

100° C., during which 136 parts of methanol pass over. The batch is then allowed to cool to 50° C.; 200 parts of ethanol are added and then gradually 536 parts of 30% sodium hydroxide solution until a permanent alkaline reaction is reached. The resulting white paste is dried under vacuum and powdered, to form a colourless product which dissolves in hot water like soap and has excellent emulsifying capacity which can be completely annulled irreversibly on addition of acid.

When 800 parts of benzine are emulsified in a solution of 5 parts of this product in 195 parts of water, a thick, stable salve is obtained. When 1000 parts of this salve-like emulsion are mixed with 1 part of 98% sulphuric acid and the whole is stirred, it breaks up almost immediately into 3 layers: A bottom layer of water, on which the crosslinked tenside floats as white flocks, and on top the benzine liberated from the emulsion.

EXAMPLE 11

A mixture of 212 parts of lacquer resin A, 130 parts of acetoacetic ester, 33 parts of n-nonylphenol and 3 parts of glacial acetic acid is heated under a weak vacuum for 1 hour at 80–100° C., during which 88 parts of n-butanol pass over. The batch is then cooled to 50° C., 200 parts of ethanol are added, then 164 parts of 30% sodium hydroxide solution are gradually dropped in, and the whole is once more heated to 80° C. and finally the alcohol is expelled. The pasty, brownish residue is dried completely in a vacuum drying cabinet at 40–50° C. 10 parts of the dry product dissolve in 990 parts of water to form a clear, lathering solution which has a pH value of 10.6. When the solution is acidified, its tenside properties are irreversibly destroyed.

EXAMPLE 12

A mixture of 212 parts of lacquer resin A, 30 parts of n-dodecanol, 170 parts of malic acid diethyl ester and 3 parts of glacial acetic acid is heated under a weak vacuum so that 84 parts of n-butanol pass over. While cooling to 25° C., 200 parts of ethanol and 248 parts of 30% sodium hydroxide solution are gradually run in until the hydrolysis product, in form of an aqueous solution thereof, given an alkaline reaction. The resulting paste is dried under vacuum at 40–50° C., to yield 300 parts of a colourless powder which readily gives a clear solution in water. When an acid is added to the lathering solution a resin settles out which is insoluble in alkali metal hydroxide solutions.

EXAMPLE 13

3 parts of glacial acetic acid are added to a mixture of 212 parts of lacquer resin A, 88 parts of n-octadecyl alcohol and 206 parts of tartaric acid diethyl ester and the whole is heated under a weak vacuum to 90–100° C., during which 76 parts of n-butanol pass over. The batch is further condensed for 15 minutes at 100° C., cooled, and 200 parts of ethanol are added. The whole is hydrolyzed by the gradual addition of 248 parts of 30% sodium hydroxide solution, with the temperature rising again to 60° C., and dried in vacuo at 40 to 50° C., to yield 410 parts of a white friable substance which is readily water-soluble. A solution containing 50 parts of this product and 5 parts of ammonium nitrate in 945 parts of water is used to impregnate cotton popelin which is then dried and hardened for 5 minutes at 150° C. The fabric displays a hydrophobizing finish which is fast to washing and dry cleaning.

EXAMPLE 14

A mixture of 532 parts of lacquer resin B, 100 parts of hydroabietyl alcohol, 570 parts of malic acid diethyl ester and 7 parts of glacial acetic acid is heated under a weak vacuum at 90–100° C., so that 166 parts of n-butanol pass over. The batch is stirred on for 30 minutes at 90° C., then cooled and mixed with 1000 parts of ethanol, and then 336 parts of solid potassium hydroxide are gradually added at 50 to 60° C. The hydrolysis furnishes a thick paste which is dried under vacuum at 40° C. and then ground, to yield 1080 parts of a faintly yellowish powder which dissolves in water in soap-fashion. When acetic acid is added to the aqueous, distincty lathering solutions, a resin settles out that is no longer soluble in excess alkalies.

I claim:

1. A process for the manufacture of a water-soluble, curable condensate containing carboxyl groups, which comprises transetherifying
   (a) an ether of a methylol urea or a methylol melamine precondensate containing methylol groups etherified with a monohydric alcohol containing 1 to 5 carbon atoms, with
   (b) an alkyl ester containing 1 to 6 carbon atoms in the alkyl radical of glycollic, 3-hydroxypropionic, 4-hydroxybutyric, tartaric, malic or lactic acid or acetoacetic ester present in the enol form, and then
   (c) hydrolyzing the acid ester groups in an alkaline medium.

2. A process according to claim 1 which comprises transetherifying
   (a) an ether of a methylol urea or a methylol melamine precondensate containing methylol groups etherified with a monohydric alcohol containing 1 to 5 carbon atoms with
   ($b_1$) a monohydroxy compound containing 6 to 22 carbon atoms, and with
   ($b_2$) an alkyl ester containing 1 to 6 carbon atoms in the alkyl radical of glycollic, 3-hydroxypropionic, 4-hydroxybutyric, tartaric, malic or lactic acid or acetoacetic ester present in the enol form, and then
   (c) hydrolyzing the acid ester groups in an alkaline medium.

3. A process according to claim 1 which comprises transetherifying
   (a) an ether of a methylol urea or a methylol melamine precondensate containing methylol groups etherified with a monohydric alcohol containing 1 to 5 carbon atoms with
   ($b_1$) a monohydroxy compound containing 6 to 22 carbon atoms with
   ($b_2$) an alkyl ester containing 1 to 6 carbon atoms in the alkyl radical of glycollic, 3-hydroxypropionic, 4-hydroxybutyric, tartaric, malic or lactic acid or acetoacetic ester present in the enol form, and with
   ($b_3$) ethanolamine, diethanolamine or triethanolamine, and then
   (c) hydrolyzing the acid ester groups in an alkaline medium.

4. A process according to claim 2, wherein the component (a) is a member selected from the group consisting of a methylol urea and a methylol melamine, etherified with n-butanol.

5. A process according to claim 2, wherein the component (a) is a member selected from the group consisting of a methylol urea and a methylol melamine, etherified with n-butanol, and component ($b_1$) is an aliphatic compound containing 6 to 22 carbon atoms and selected from the group consisting of a monocarboxylic acid and an alkanol.

6. A process according to claim 2, wherein the component (a) is a member selected from the group consisting of a methylol urea and a methylol melamine, etherified with n-butanol, component ($b_1$) is an aliphatic compound containing 6 to 22 carbon atoms and selected from the group consisting of a monocarboxylic acid and an alkanol, and component ($b_2$) is an alkyl ester selected from the group consisting of the esters of lactic, 3-hydroxypropionic, 4-hydroxybutyric and glycolic acid whose alkyl radical contains 1 to 6 carbon atoms.

7. A process according to claim 3, wherein the component (a) is a member selected from the group consisting of a methylol urea and a methylol melamine, etherified with n-butanol, component ($b_1$) is an aliphatic compound containing 6 to 22 carbon atoms and selected from the group consisting of a monocarboxylic acid and an alkanol, component ($b_2$) is an alkyl ester selected from the group consisting of the esters of lactic, 3-hydroxypropionic, 4-hydroxybutyric and glycolic acid whose alkyl radical contains 1 to 6 carbon atoms, and component ($b_3$) is triethanolamine.

8. A process according to claim 1, wherein component (a) is methylol urea etherified with n-butanol and component (b) is an alkyl ester of glycolic acid whose alkyl radical contains 1 to 6 carbon atoms.

9. A process according to claim 2, wherein component (a) is methylol urea etherified with n-butanol, component ($b_1$) is lauryl alcohol, and component ($b_2$) is an alkyl ester of glycolic acid whose alkyl radical contains 1 to 6 carbon atoms.

10. A process according to claim 2, wherein component (a) is a methylol melamine etherified with n-butanol, component ($b_1$) is lauryl alcohol, and component ($b_2$) is an alkyl ester of lactic acid, whose alkyl radical contains 1 to 6 carbon atoms.

References Cited

UNITED STATES PATENTS

| | | | |
|---|---|---|---|
| 2,191,957 | 2/1940 | Edgar et al. | 260—70 |
| 2,232,609 | 2/1941 | Jacobson | 260—70 |
| 2,327,984 | 8/1943 | West | 260—29 |
| 2,680,734 | 6/1954 | Dearing | 260—70 |
| 2,554,475 | 5/1951 | Suen et al. | 260—69 |
| 3,396,209 | 8/1968 | Sekmakas et al. | 260—855 |
| 3,449,228 | 6/1969 | Yurcheshen et al. | 204—181 |
| 3,450,660 | 6/1969 | Sekmakas | 260—29.4 |
| 3,464,946 | 9/1969 | Downing | 260—29.4 |

FOREIGN PATENTS

| | | | |
|---|---|---|---|
| 1,480,575 | 5/1967 | France | 260—67.6 |
| 1,546,484 | 11/1968 | France | 260—67.6 |

WILLIAM H. SHORT, Primary Examiner

R. J. KOCH, Assistant Examiner

U.S. Cl. X.R.

117—139.5 A, 161 LN, 161 UC; 252—117, 152, 357; 260—21, 29.4 R, 29.4 UA, 33.4 R, 70 R, 70 M, 249.6